US012050573B2

(12) United States Patent
Eloul et al.

(10) Patent No.: US 12,050,573 B2
(45) Date of Patent: Jul. 30, 2024

(54) SYSTEMS AND METHODS FOR STREAMING CLASSIFICATION OF DISTRIBUTED LEDGER-BASED ACTIVITIES

(71) Applicant: JPMORGAN CHASE BANK, N.A., New York, NY (US)

(72) Inventors: Shaltiel Eloul, London (GB); Sean Moran, London (GB); Jacob Mendel, Givat Brenner (IL); Shafir Balitsky, Givaataim (IL); Tal Dadia, Beit She'an (IL)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/806,211

(22) Filed: Jun. 9, 2022

(65) Prior Publication Data

US 2022/0398264 A1 Dec. 15, 2022

Related U.S. Application Data

(60) Provisional application No. 63/209,323, filed on Jun. 10, 2021.

(51) Int. Cl.
*G06F 16/22* (2019.01)
*G06F 16/27* (2019.01)
(Continued)

(52) U.S. Cl.
CPC .............. *G06F 16/22* (2019.01); *G06F 16/27* (2019.01); *G06F 16/285* (2019.01); *G06N 3/04* (2013.01)

(58) Field of Classification Search
CPC ........ G06F 16/22; G06F 16/27; G06F 16/285; G06F 16/182; G06N 3/04; G06Q 20/389;
(Continued)

(56) References Cited

U.S. PATENT DOCUMENTS

2017/0317997 A1* 11/2017 Smith .............. G06Q 20/38215
2019/0279215 A1* 9/2019 Kuchar ............. G06Q 20/4016
(Continued)

*Primary Examiner* — Evan Aspinwall
(74) *Attorney, Agent, or Firm* — GREENBERG TRAURIG LLP

(57) ABSTRACT

Systems and methods for streaming classification of distributed ledger-based activities are disclosed. In one embodiment, a method for streaming classification of distributed ledger-based activities may include: receiving, at a detection computer program executed by a server and from a distributed ledger network, information for a plurality of transactions; receiving, from a database and at the detection computer program, node information that identifies a plurality of nodes as involved in illicit transactions, as being involved in licit transactions, or unknown; applying, by the detection computer program, exponential time sampling to sample labels and associated features; training, by the detection computer program, a classifier; receiving, by the detection computer program, a streaming transaction from the distributed ledger network; predicting, by the detection computer program, a classification for the streaming transaction using the trained classifier; and outputting, by the detection computer program, an alert based on the prediction.

18 Claims, 2 Drawing Sheets

(51) Int. Cl.
*G06F 16/28* (2019.01)
*G06N 3/04* (2023.01)

(58) Field of Classification Search
CPC .......... G06Q 2220/00; G06Q 30/0202; G06Q 30/0215; H04L 9/50; H04L 2209/56
USPC ........................................................ 707/740
See application file for complete search history.

(56) References Cited

U.S. PATENT DOCUMENTS

| | | | |
|---|---|---|---|
| 2021/0073913 A1* | 3/2021 | Ingargiola | G06Q 20/02 |
| 2022/0067752 A1* | 3/2022 | Fang | H04L 63/20 |
| 2022/0101326 A1* | 3/2022 | Kim | H04L 63/0464 |
| 2022/0198471 A1* | 6/2022 | Silva | G06F 16/9024 |
| 2022/0255796 A1* | 8/2022 | Smith | H04L 63/123 |
| 2022/0398573 A1* | 12/2022 | Robinson | G06F 16/3335 |

* cited by examiner

SYSTEMS AND METHODS FOR STREAMING CLASSIFICATION OF DISTRIBUTED LEDGER-BASED ACTIVITIES

RELATED APPLICATIONS

This application claims priority to, and the benefit of, U.S. Provisional Patent Application Ser. No. 63/209,323, filed Jun. 10, 2021, and of U.S. patent application Ser. No. 17/657,051, filed Mar. 29, 2022, the disclosures of which are hereby incorporated, by reference, in their entireties.

BACKGROUND OF THE INVENTION

1. Field of the Invention

Embodiments relate to systems and methods for streaming classification of distributed ledger-based activities.

2. Description of the Related Art

Cryptocurrency and digital currency transactions have been increasing over the past decade. Due to the anonymous nature of some ledgers, cryptocurrency can also be a central route for non-legitimate activities, such as blackmails, money laundering, darknet trades, fraud, and terror funding. This poses a great challenge to public digital currency ledgers being fully trusted.

In recent years, efforts have been devoted to build artificial intelligence-based mechanisms to classify organized activities and detect illicit transactions. For example, machine learning algorithms based on Random Forest, XGBoost, and neural network models (e.g., Graph Convolutional Network ("GCN") models) may use transactions as nodes, connections, and features on a blockchain network, embedded as a layer in a deep neural network architecture. The Random Forest and GCN model application for BitCoin activity classification is described in the article, T. N. Kipf et al., "Semi-Supervised Classification With Graph Convolutional Networks," arXiv:1609.02907 (2016), the disclosure of which is hereby incorporated, by reference, in its entirety. A comprehensive study in M. Weber, et al., "Anti-Money Laundering In Bitcoin: Experimenting With Graph Convolutional Networks For Financial Forensics," arXiv: 1908.02591 (2019), the disclosure of which is hereby incorporated, by reference, in its entirety, reported an illicit transaction detection rate of between 72% and 75% for various variations on neural-network (NN) architecture using GCN layers.

SUMMARY OF THE INVENTION

Systems and methods for streaming classification of distributed ledger-based activities are disclosed. In one embodiment, a method for streaming classification of distributed ledger-based activities may include: (1) receiving, at a detection computer program executed by a server and from a distributed ledger network, information for a plurality of transactions; (2) receiving, from a database and at the detection computer program, node information that identifies a plurality of nodes as involved in illicit transactions, as being involved in licit transactions, or unknown; (3) applying, by the detection computer program, exponential time sampling to sample labels and associated features; (4) training, by the detection computer program, a classifier; (5) receiving, by the detection computer program, a streaming transaction from the distributed ledger network; (6) predicting, by the detection computer program, a classification for the streaming transaction using the trained classifier; and (7) outputting, by the detection computer program, an alert based on the prediction.

In one embodiment, for each transaction, the information may include a plurality of nodes involved in the transaction, an amount of the transaction, and a number of parties to the transaction.

In one embodiment, the information may also include a block number, and an index and a value of a currency for the transaction.

In one embodiment, the classifier may include a Graph Convolutional Network that may include an architecture having three hidden layers. In another embodiment, the classifier may include a Random Forest classifier.

In one embodiment, the trained classifier may output a prediction as a binary value, a prediction of a probability, etc.

In one embodiment, the method may also include causing, by the detection computer program, the streaming transaction predicted to be illicit to be stopped.

In one embodiment, the method may also include adding, by the detection computer program, addresses associated with the streaming transaction predicted to be illicit to a database.

According to another embodiment, a system may include a distributed ledger network comprising a plurality of nodes and storing information for a plurality of transactions; and a server executing a detection computer program that receives the information for a plurality of transactions, receives node information that identifies one or more of the plurality of nodes as involved in illicit transactions, as being involved in licit transactions, or unknown, applies exponential time sampling to sample labels and associated features, trains a classifier, receives a streaming transaction from the distributed ledger network, predicts a classification for the streaming transaction using the trained classifier, and outputs an alert based on the prediction.

In one embodiment, for each transaction, the information may include a plurality of nodes involved in the transaction, an amount of the transaction, and a number of parties to the transaction.

In one embodiment, the information may also include a block number, and an index and a value of a currency for the transaction.

In one embodiment, the classifier may include a Graph Convolutional Network comprising an architecture having three hidden layers, a Random Forest classifier, etc.

In one embodiment, the trained classifier may output a prediction as a binary value or a prediction of a probability.

In one embodiment, the detection computer program may be configured to cause the streaming transaction predicted to be illicit to be stopped.

In one embodiment, the detection computer program may be configured to add addresses associated with the streaming transaction predicted to be illicit to a database.

According to another embodiment, a non-transitory computer readable storage medium, may instructions stored thereon, which when read and executed by one or more computer processors, cause the one or more computer processors to perform steps including: receiving, from a distributed ledger network, information for a plurality of transactions, wherein, for each transaction, the information comprises a plurality of nodes involved in the transaction, an amount of the transaction, and a number of parties to the transaction; receiving, from a database, node information that identifies a plurality of nodes as involved in illicit transactions, as being involved in licit transactions, or unknown; applying exponential time sampling to sample labels and associated features; training a classifier, wherein the classifier comprises a Graph Convolutional Network comprising an architecture having three hidden layers or a Random Forest classifier; receiving a streaming transaction from the distributed ledger network; predicting a classification for the streaming transaction using the trained classifier, wherein the trained classifier outputs a prediction as a binary value or a prediction of a probability; and outputting an alert based on the prediction.

In one embodiment, the non-transitory computer readable storage medium may also include instructions stored thereon, which when read and executed by the one or more computer processors the one or more computer processors to perform steps including: causing the streaming transaction predicted to be illicit to be stopped; and adding addresses associated with the streaming transaction predicted to be illicit to a database.

Embodiments may include a method for sampling a training set to improve detection of supervised model of illicit transactions in cryptocurrency blockchains. Embodiments may use limited data for training the results of exponential time sampling. The method of sampling may adapt to changes in the neural network due to major events and thus has practical application in streaming transactions in real-time. Embodiments may facilitate the testing of the neural network model on some or all timesteps of a set of transactions in the blockchain, thereby providing more objective testing of the applied neural network model applied.

According to one embodiment, a method for streaming classification of distributed ledger-based activities may include: (1) receiving, at a detection computer program executed by a server and from a distributed ledger network, information for a plurality of transactions; (2) receiving, from a database and at the detection computer program, node information that identifies a plurality of nodes as involved in illicit transactions, as being involved in licit transactions, or unknown; (3) applying, by the detection computer program, exponential time sampling to sample labels and associated features; (4) training, by the detection computer program, a classifier; (5) receiving, by the detection computer program, a streaming transaction from the distributed ledger network; (6) predicting, by the detection computer program, a classification for the streaming transaction using the trained classifier; and (7) outputting, by the detection computer program, an alert based on the prediction.

In one embodiment, for each transaction, the information may include a plurality of nodes involved in the transaction, an amount of the transaction, and a number of parties to the transaction.

In one embodiment, the information may further include a block number, and an index and a value of a currency for the transaction.

In one embodiment, the classifier may include a Graph Convolutional Network. The Graph Convolutional Network may include an architecture having three hidden layers.

In one embodiment, the classifier may include a Random Forest classifier.

In one embodiment, the trained classifier may output a prediction as a binary value, as a probability, etc.

In one embodiment, the method may further include causing, by the detection computer program, the streaming transaction predicted to be illicit to be stopped.

In one embodiment, the method may further include adding, by the detection computer program, addresses associated with the streaming transaction predicted to be illicit to a database.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for streaming classification of distributed ledger-based activities.

Cryptocurrency networks are dynamic networks and are affected by events. For instance, the shutdown of a major "darknet" operation often causes a reorganization of the illicit transaction communications on the cryptocurrency network, and as a result, known detection techniques generally do not perform well. Thus, embodiments disclosed herein adapt to changes in the network to classify distributed ledger-based activities.

For example, embodiments may combine a classifier, such as a GCN, a Random Forest Classifier, etc., with exponential time sampling to provide more efficient training for the network. Thus, embodiments account for temporal changes on the network and potentially be effective for anonymous distributed ledger-based activities.

Exponential time sampling may provide a solution that is practical in real-time streaming detection algorithm. It has better performance in cases where previous knowledge on the network is limited and allows the neural network to adapt to changes in the network.

Embodiments may provide at least some of the following technical advantages: (1) the use of an algorithm that address the combination of a GCN with exponential time sampling in a distributed ledger network that enables the detection of illicit transactions in real-time streaming of the digital currency; (2) the use of an adaptable fraud detection algorithm that may be used with various graph-based neural network architectures; (3) practical application for live streaming of network data; (4) may be used with limited amount of data, and may adapt to temporal changes such as significant events; and (5) enablement of semantic similarity comparison between structured resources. Embodiments may have applicability in a variety of industries, including banking, insurance, legal, hedge funds, exchanges, etc.

Figure 1:
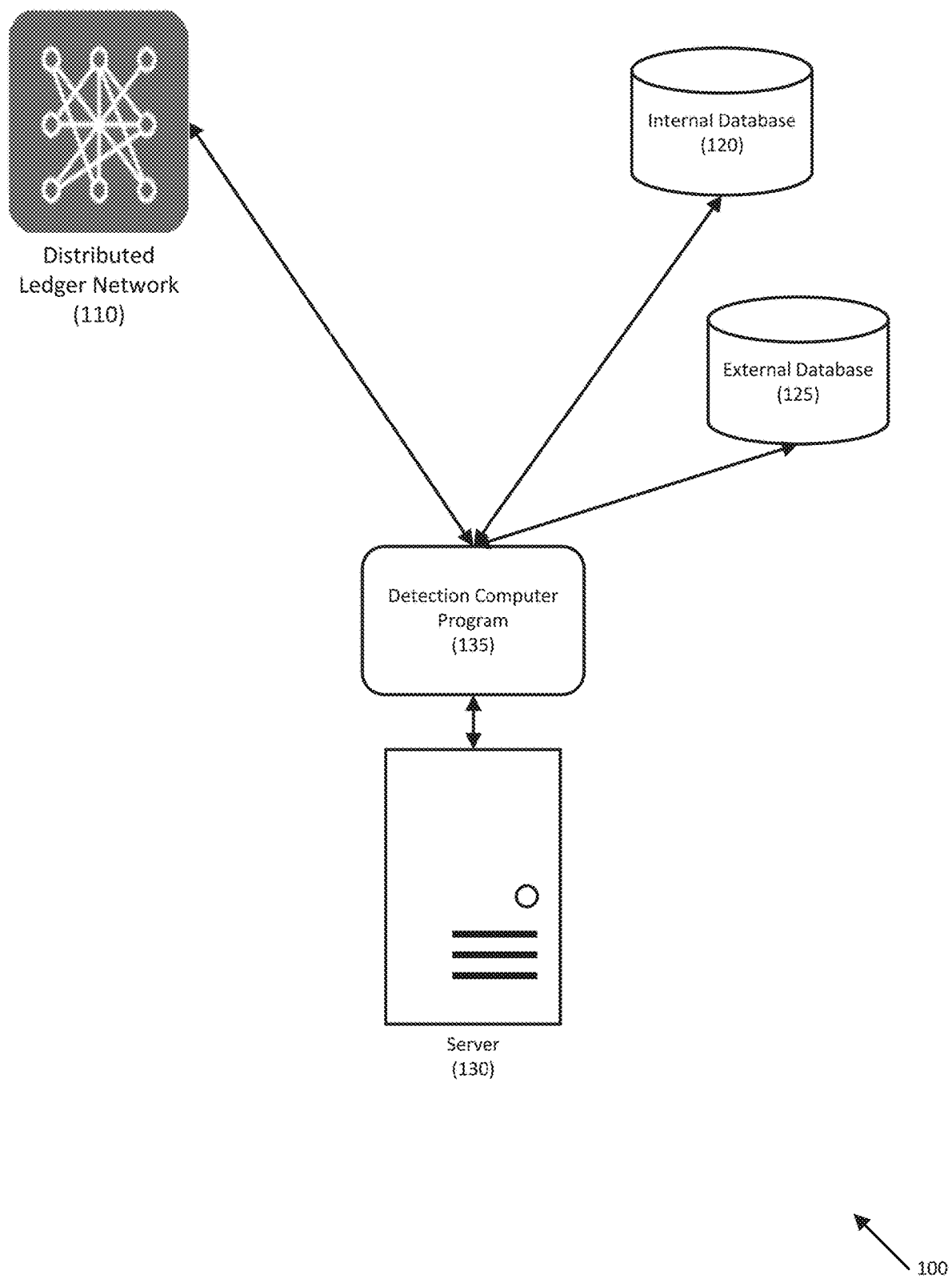
FIG. 1 illustrates a system for streaming classification of distributed ledger-based activities according to one embodiment.

Referring to FIG. 1, a system for streaming classification of distributed ledger-based activities is disclosed according to one embodiment. System 100 may include distributed ledger network 110, which may be any suitable distributed ledger network. In one embodiment, distributed ledger network 110 may support a cryptocurrency that provides anonymity, such as Bitcoin.

Server 130 may execute detection computer program 135. Server 130 may be any suitable server, including physical servers, cloud-based servers, combinations, etc. Detection computer program 135 may receive streaming data from distributed ledger network 110 and may identify transaction details, such as the nodes involved in the transaction, and may use data from internal database 120 to assign each node as being involved in a licit or an illicit transaction. For example, internal database 120 may be associated with a financial institution or other trusted entity, and detection computer program may identify transactions from such nodes as licit.

In one embodiment, detection computer program 135 may further receive information on nodes from external database 125. External database 125 may be provided by a third party and may identity nodes that may be associated with illicit transactions. External database 125 may further identify nodes involved in licit transactions.

In one embodiment, in a private domain blockchain, or in a public blockchain that there is control on the validation of transaction contracts, the detection computer program may stop a transaction from happening. In existing public blockchains, such as BitCoin or Ethereum, the illicit addresses may be identified, tracked, and reported so that future transactions with these addresses can be avoided.

Figure 2:
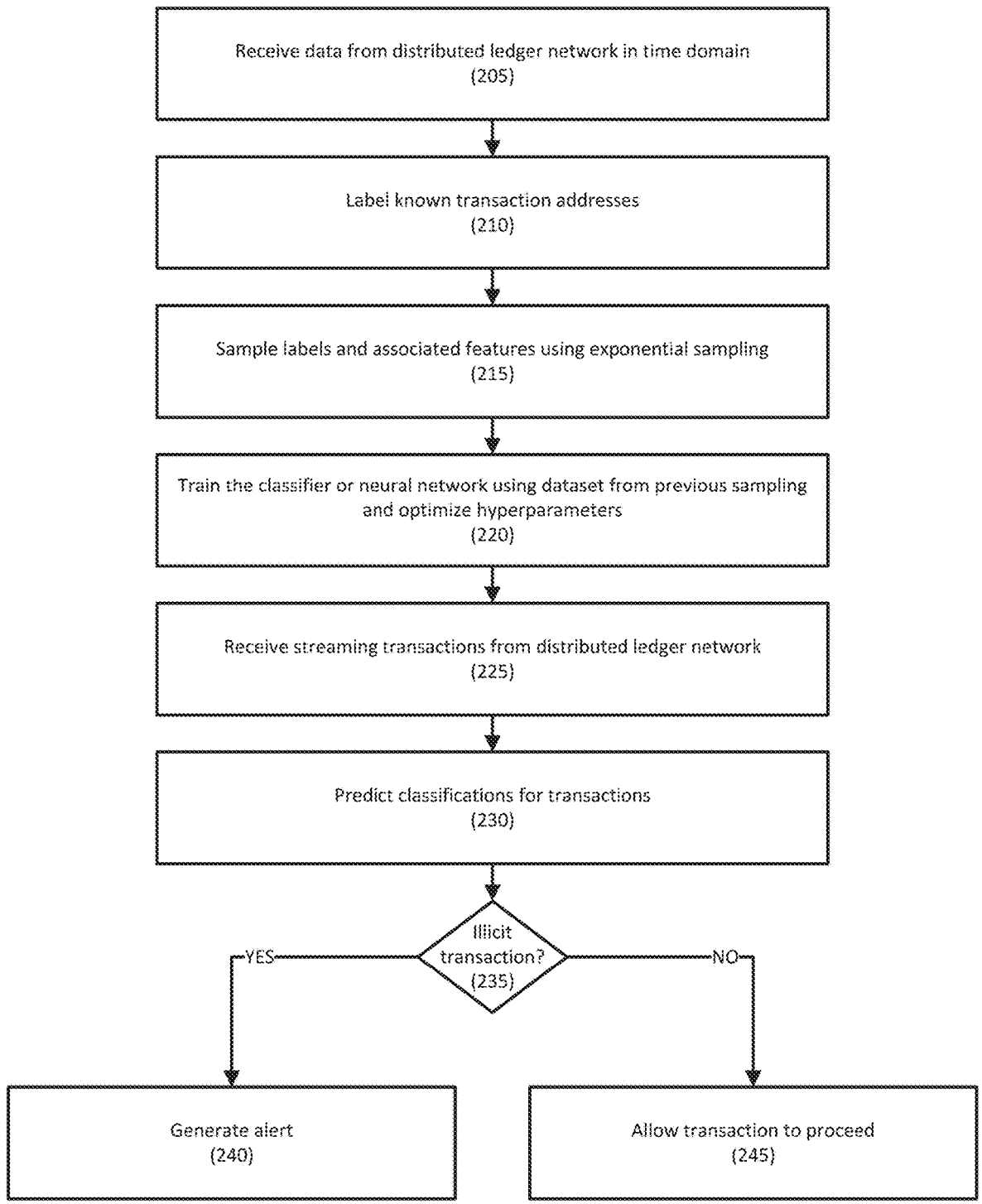
FIG. 2 depicts a method for streaming classification of distributed ledger-based activities according to one embodiment.

Referring to FIG. 2, a method for streaming classification of distributed ledger-based activities is disclosed according to one embodiment.

In step 205, a detection computer program executed by a server may receive transaction data from a distributed ledger network. For example, the distributed ledger network may provide the detection computer program with information such as the nodes involved in the transaction, the amount of the transaction, the number of parties in the transaction, the time zone of the transaction, etc. Any other suitable information including block number, index and value of the currency, current volume of the market, etc. may be received as is necessary and/or desired.

In step 210, the detection computer program may label known nodes. For example, the detection computer program may receive node information from, for example, internal databases and external databases. The databases may identify nodes as known as being involved in licit transactions, or illicit transactions, or as unknown.

In one embodiment, steps 205 and 210 may be performed in parallel, in any order, etc.

In step 215, the detection computer program may sample labels and associated features using exponential time sampling. For example, the detection computer program may use exponential time sampling. The size of data test and the train sets may be defined as follows:

$$N_{x_{test}}(t) = (1-\theta)N_{x_{train}}(t)$$

$$N_{x_{train}}(i) = \theta(i)x_t$$

The exponential decay for the training set can be defined by uniformly sampling $N_{x_{train}}(i)$ for each i:

$$\theta(i) = \begin{cases} \theta_t, & i = t \\ \theta(i-1)^a, & i < t \end{cases}$$

where a is an optimized exponential factor, and $\theta_t$ may determine the fraction at the current time for the size of the training set.

In embodiments, imbalance weights for loss calculation from the current training timestep may be accounted for using the linear fit:

loss_Ilicit Weight = $1 - c(N_{train\ illicit}/N_{train\ licit})$ where c is an optimized parameter.

In step 220, the detection computer program may train the classifier or neural network as the GCN. For example, embodiments may use a GCN architecture comprising three hidden layers (e.g., $H_1$, $H_2$, $H_3$) combining two graph convolution layers and two dense layers using skips. The input vector x may be embedded with one graph convolutional layer and two dense layers, and the output may be mixed using a hyperparameter gamma ($\gamma$). The output layer may then be embedded in a second graph convolutional layer and mixed with the original hidden layer $H_2$ to provide empirically optimal performance. For example:

$$H_2 = \gamma_1 \text{ReLU}(\hat{A}XW_{GC_0}) + (1-\gamma_1)(\text{ReLU}(xW_{D_0})W_{D_1})$$

$$H_3 = \text{softmax}(\gamma_2 \hat{A} \cdot H_2 W_{GC_1} + (1-\gamma_2)H_2)$$

where $\hat{A}$ is the normalized symmetric adjacency matrix (A) of the network graph. $\hat{A}$ may be defined as follows:

$$\hat{A} = D^{-\frac{1}{2}} \tilde{A} D^{-\frac{1}{2}} \text{ where } \tilde{A} = A + I \text{ and } D = \text{diag}\left(\sum_j A_{ij}\right)$$

Using the neural network, matrix x may be provided as the input contains the features of each node, along with $\hat{A}$.

Embodiments may also use a RF (Random Forest) classifier with the features for each transaction as inputs for training and predicting. Standard values may be used for maximum features, and the maximum depth of the tree.

Next, the loss over the training set, which contains labelled illicit/licit nodes, may be calculated. The loss weights of illicit/licit label loss may be optimized to compensate for the imbalance of the licit/illicit ratio. For the result, a dataset may contain illicit and non-illicit transactions as the temporal populations of the labels.

In step 225, the detection computer program may receive streaming transactions from the distributed ledger network. In one embodiment, a node on the distributed ledger network may provide the transactions to the detection computer program. The information received may be similar to the information received in step 205, including, for example, the nodes involved in the transaction, the amount of the transaction, the number of parties in the transaction, the time zone of the transaction, the block number, index and value of the currency, current volume of the market, etc.

In step 230, the detection computer program may predict classifications for the transactions using the trained classifier, such as GCN/RF. The prediction uses the trained classifier to then get a new unknown transaction information and predict if it is an illicit or not illicit. The detection computer program may return a binary value based on a threshold, (e.g., illicit/not illicit), a probability, etc.

If, in step 235, the transaction is predicted to be an illicit transaction in step 240, an alert may be generated. For example, in a private blockchain, the transaction may be stopped and re-checked manually if desired. The address(es) may be reported and added to a list of denial addresses.

If, in step 235, the transaction is predicted to be a licit transaction in step 245, the transaction may proceed.

In addition, although several embodiments have been disclosed, the embodiments are not exclusive, and features disclosed in one embodiment may be used with other embodiments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for streaming classification of distributed ledger-based activities, comprising:
   receiving, at a detection computer program executed by a server and from a distributed ledger network, information for a plurality of transactions;
   receiving, from a database and at the detection computer program, node information in which a plurality of nodes are previously labeled as involved in illicit transactions, are previously labeled as being involved in licit transactions, or are previously labeled as unknown;
   applying, by the detection computer program, exponential time sampling to sample the labels and associated features;
   training, by the detection computer program, a classifier using the sampled labels and features;
   receiving, by the detection computer program, a streaming transaction from the distributed ledger network;
   predicting, by the detection computer program, a classification for the streaming transaction using the trained classifier; and
   taking, by the detection computer program, an action based on the prediction, wherein the action comprises approving the streaming transaction to proceed in response to the classification being a licit transaction, and stopping the streaming transaction and outputting an alert in response to the classification being an illicit transaction.

2. The method of claim 1, wherein, for each transaction, the information comprises a plurality of nodes involved in the transaction, an amount of the transaction, and a number of parties to the transaction.

3. The method of claim 2, wherein the information further comprises a block number, and an index and a value of a currency for the transaction.

4. The method of claim 1, wherein the classifier comprises a Graph Convolutional Network.

5. The method of claim 4, wherein the Graph Convolutional Network comprises an architecture having three hidden layers.

6. The method of claim 1, wherein the classifier comprises a Random Forest classifier.

7. The method of claim 1, wherein the trained classifier outputs a prediction as a binary value.

8. The method of claim 1, wherein the trained classifier outputs a prediction of a probability.

9. The method of claim 1, wherein the action further comprises adding addresses associated with the streaming transaction to a database in response to the classification being illicit.

10. A system, comprising:
    a distributed ledger network comprising a plurality of nodes and storing information for a plurality of transactions; and
    a server executing a detection computer program that receives the information for a plurality of transactions, receives node information in which a plurality of nodes are previously labeled as involved in illicit transactions, are previously labeled as being involved in licit transactions, or are previously labeled as unknown, applies exponential time sampling to sample the labels and associated features, trains a classifier using the sampled labels and features, receives a streaming transaction from the distributed ledger network, predicts a classification for the streaming transaction using the trained classifier, and takes an action based on the prediction, wherein the action comprises approving the streaming transaction to proceed in response to the classification being a licit transaction, and stopping the streaming transaction and outputting an alert in response to the classification being an illicit transaction.

11. The system of claim 10, wherein, for each transaction, the information comprises a plurality of nodes involved in the transaction, an amount of the transaction, and a number of parties to the transaction.

12. The system of claim 11, wherein the information further comprises a block number, and an index and a value of a currency for the transaction.

13. The system of claim 10, wherein the classifier comprises a Graph Convolutional Network comprising an architecture having three hidden layers.

14. The system of claim 10, wherein the classifier comprises a Random Forest classifier.

15. The system of claim 10, wherein the trained classifier outputs a prediction as a binary value or a prediction of a probability.

16. The system of claim 10, wherein the action comprises adding addresses associated with the streaming transaction to a database in response to the classification being illicit.

17. A non-transitory computer readable storage medium, including instructions stored thereon, which when read and executed by one or more computer processors, cause the one or more computer processors to perform steps comprising:
receiving, from a distributed ledger network, information for a plurality of transactions, wherein, for each transaction, the information comprises a plurality of nodes involved in the transaction, an amount of the transaction, and a number of parties to the transaction;
receiving, from a database, node information in which a plurality of nodes are previously labeled as involved in illicit transactions, are previously labeled as being involved in licit transactions, or are previously labeled as unknown;
applying exponential time sampling to sample the labels and associated features;
training a classifier using the sampled labels and features, wherein the classifier comprises a Graph Convolutional Network comprising an architecture having three hidden layers or a Random Forest classifier;
receiving a streaming transaction from the distributed ledger network;
predicting a classification for the streaming transaction using the trained classifier, wherein the trained classifier outputs a prediction as a binary value or a prediction of a probability; and
taking an action based on the prediction, wherein the streaming transaction is approved to proceed in response to the classification being a licit transaction, and wherein an alert is output in response to the classification being an illicit transaction.

18. The non-transitory computer readable storage medium of claim 17, wherein the action further comprises adding addresses associated with the streaming transaction to a database in response to the classification being an illicit transaction.

* * * * *